Dec. 15, 1959                    J. S. MURAMATSU ET AL                2,917,289
                                AERIAL PICKUP AND TOW BOOM
Filed Jan. 28, 1957                                                6 Sheets-Sheet 1

INVENTORS
JAMES S. MURAMATSU
DUNCAN V. HARDING
BY
Charles F. Dischler
ATTORNEY

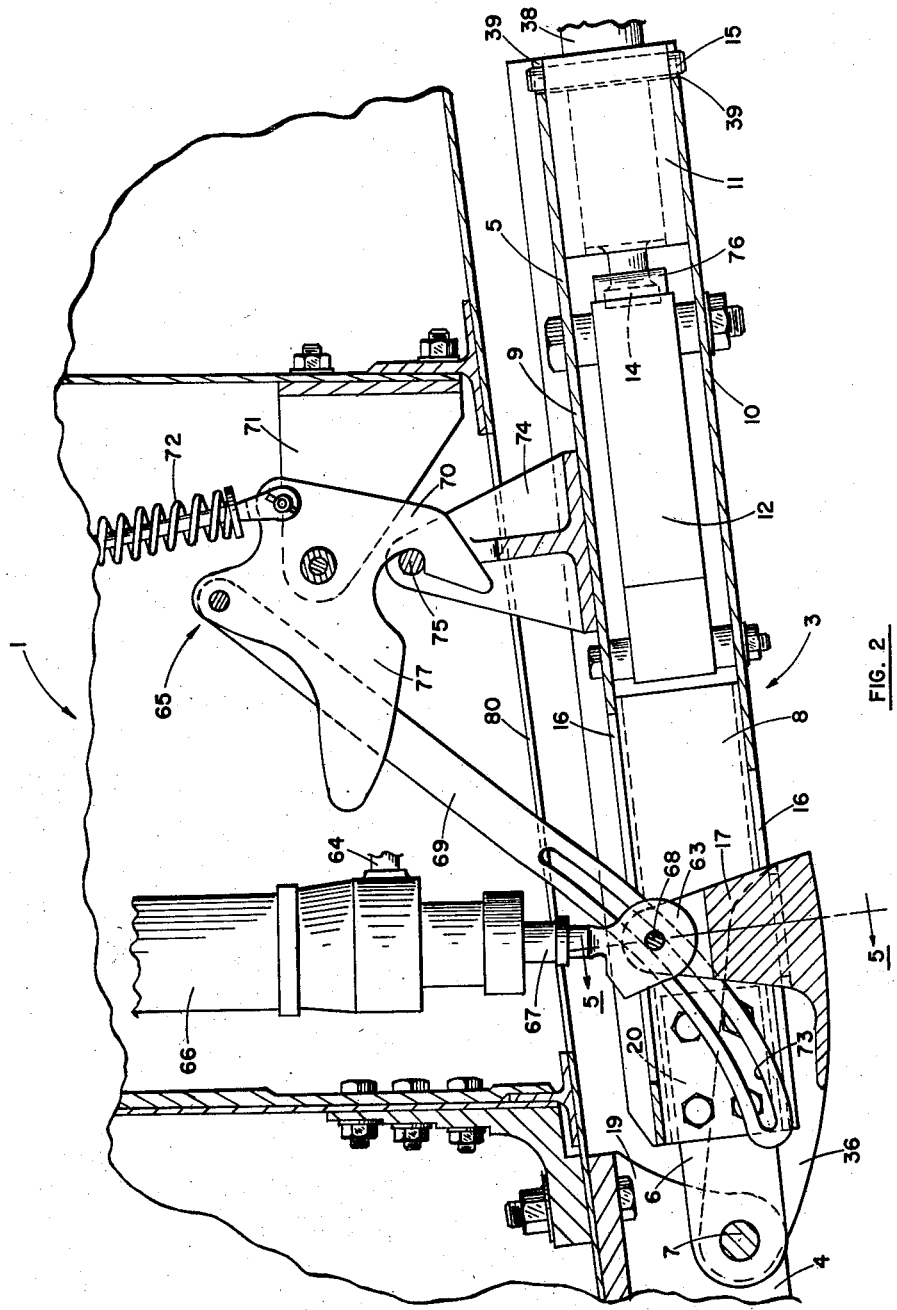

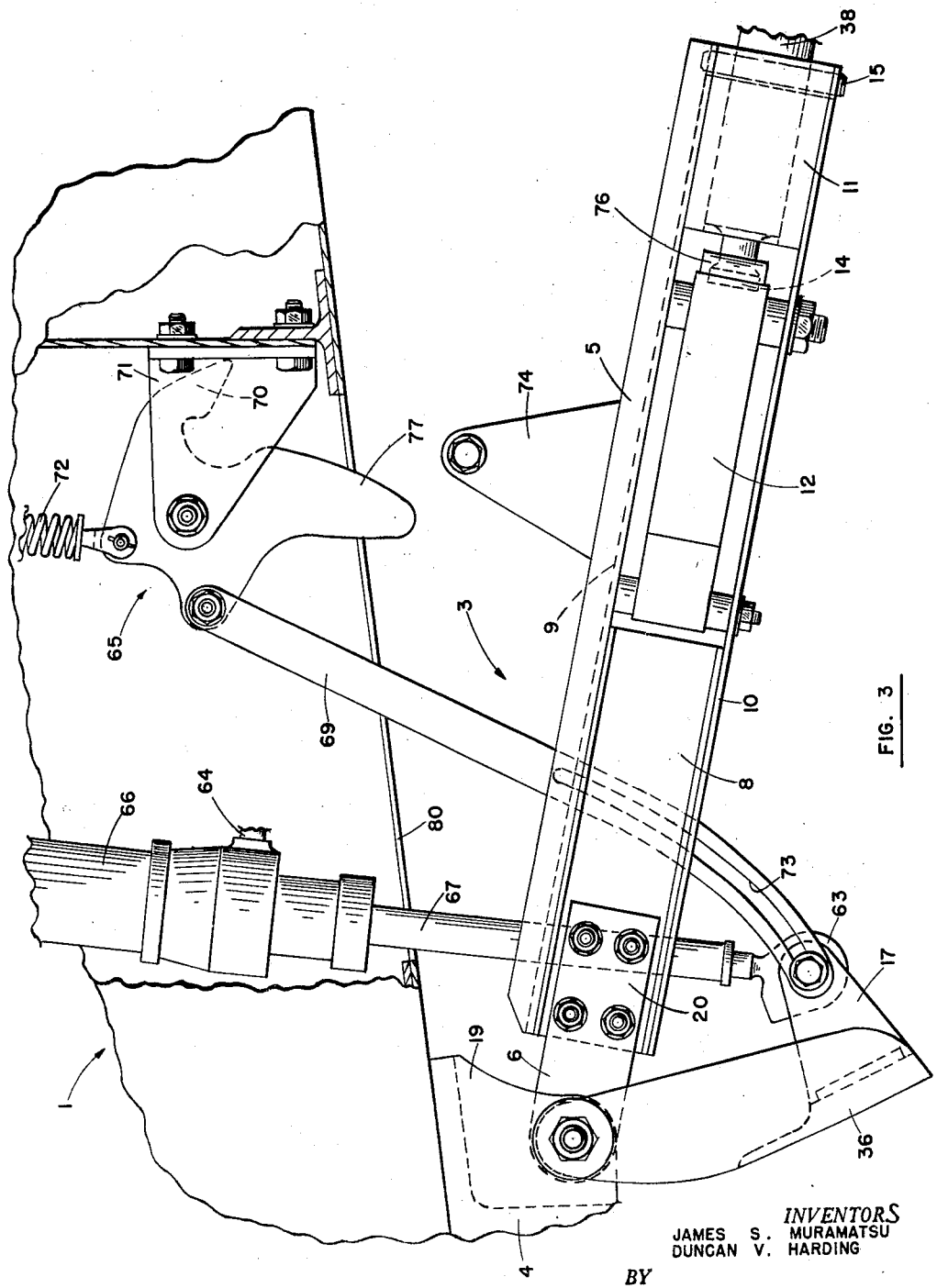

Dec. 15, 1959   J. S. MURAMATSU ET AL   2,917,289
AERIAL PICKUP AND TOW BOOM

Filed Jan. 28, 1957   6 Sheets-Sheet 4

INVENTORS
JAMES S. MURAMATSU
DUNCAN V. HARDING
BY
Charles F. Dischler
ATTORNEY

Dec. 15, 1959
J. S. MURAMATSU ET AL
2,917,289
AERIAL PICKUP AND TOW BOOM
Filed Jan. 28, 1957
6 Sheets-Sheet 5
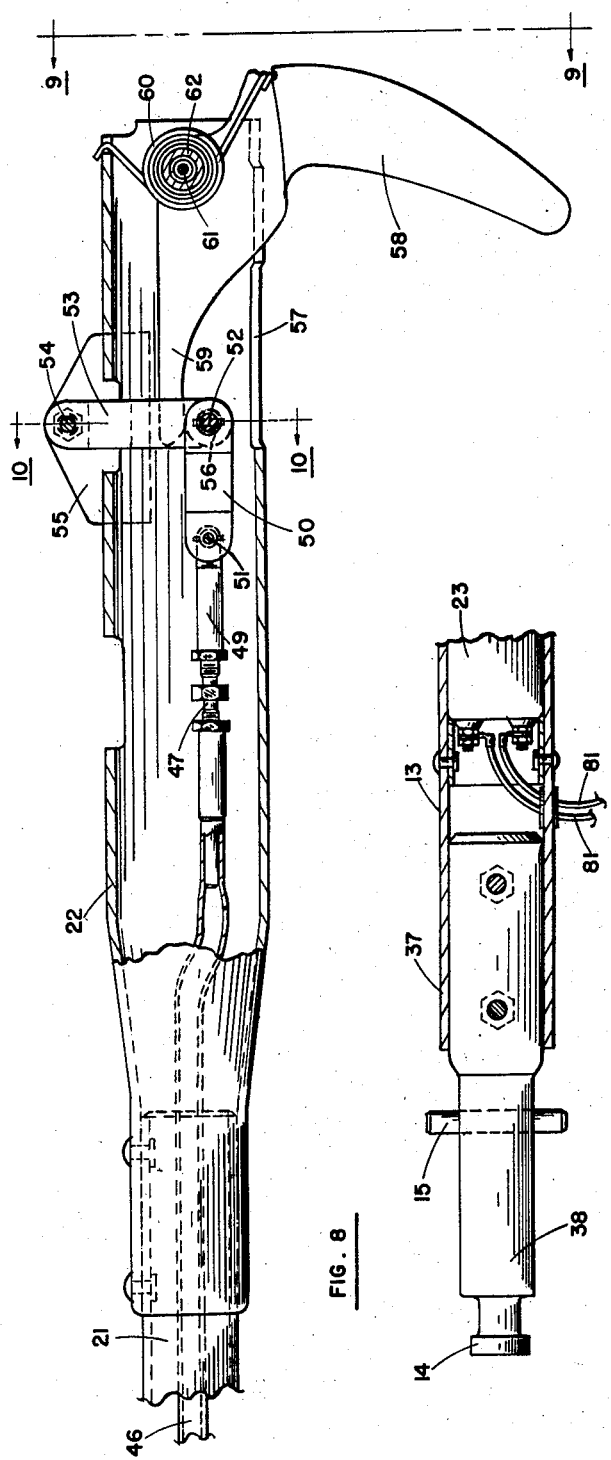
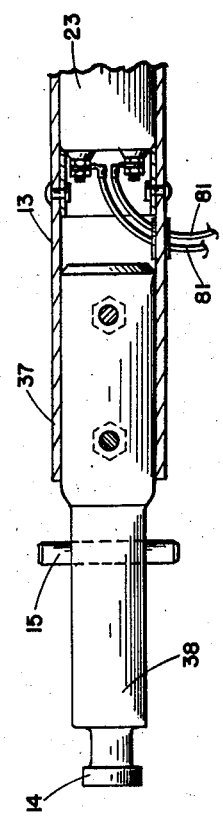
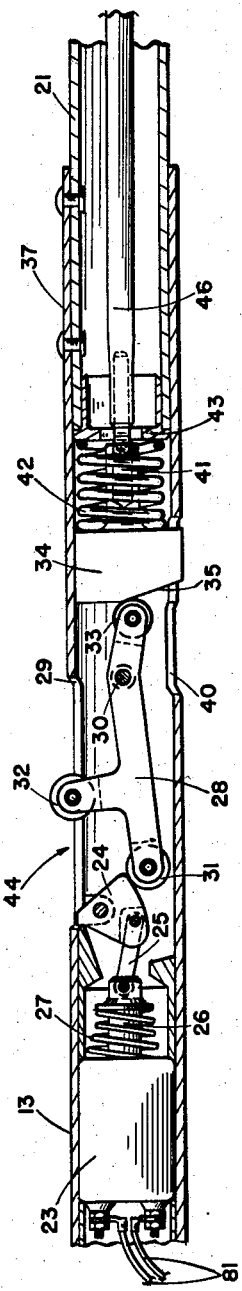
*INVENTORS*
JAMES S. MURAMATSU
DUNCAN V. HARDING
BY Charles F. Pischler
ATTORNEY

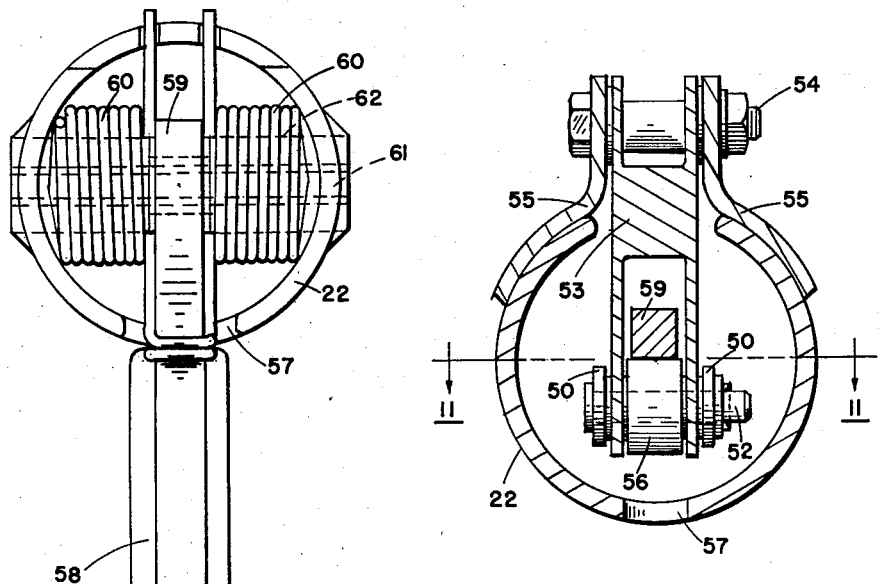
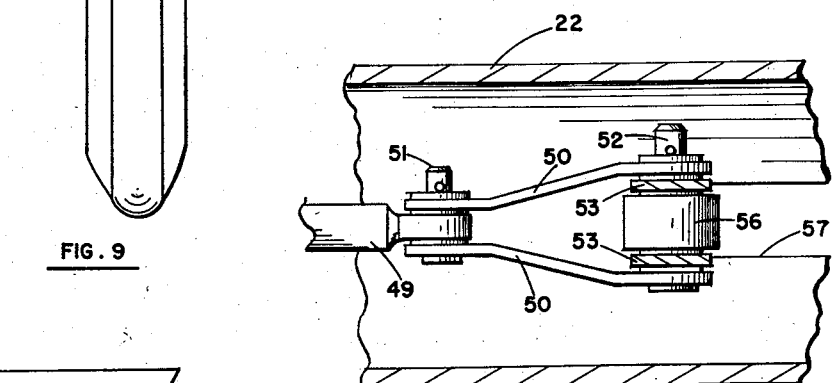
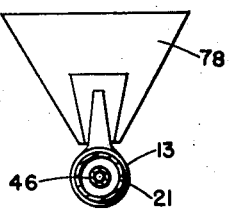

United States Patent Office 2,917,289
Patented Dec. 15, 1959

2,917,289

AERIAL PICKUP AND TOW BOOM

James S. Muramatsu, Santa Monica, and Duncan V. Harding, Los Angeles, Calif., assignors to North American Aviation, Inc., Los Angeles, Calif.

Application January 28, 1957, Serial No. 636,703

6 Claims. (Cl. 258—1.2)

This application relates to a towing device and in particular it relates to an aerial pickup and tow boom for attachment to an aircraft for towing devices such as gunnery and rocket targets.

Flight training in modern military aircraft requires gunnery and rocket training to be conducted at the high speeds encountered during the normal combat operation of such aircraft. This necessitates the use of the small and faster high speed aircraft of the fighter type for towing aerial targets at speeds that will allow development of gunnery techniques suitable for high speed combat. Until the present invention no adequate device was available that would allow an aircraft of this type to repeatedly pickup, tow and release such aerial targets during the course of one flight.

This invention provides a retractable pickup boom adapted for attachment to the underside of an aircraft and having a pivotally releasable hook at the rear end for engaging a pickup tow line which is initially supported above the ground. More specifically the invention comprises a hollow boom pivotally suspended at its forward end beneath the aircraft and adapted to be held in a raised retracted position directly beneath the aircraft, or to be released and allowed to trail freely in the air stream during the pickup and towing operation. The boom contains a releasable hook-latching means which can be recocked in flight to render the hook operable for picking up and towing another target after release of a first tow target.

Therefore, it is an object of this invention to provide an assembly for effecting air-to-ground pickups which is adapted to be attached to existing aircraft.

It is also an object of this invention to provide a pickup and towing assembly which can be recocked in flight to effect pickup of a second tow line after release of a first tow line.

It is a further object of this invention to provide a tow boom assembly that may be locked in an up-position close beneath the fuselage of an aircraft.

It is a still further object of this invention to provide a tow boom assembly including a releasable shackle for jettisoning the boom during flight should the hook-release or boom-retraction mechanism malfunction.

These and other objects and advantages of the present invention will become apparent to those skilled in the art after reading the present specification and the accompanying drawings forming a part thereof, in which:

Fig. 2 is a fragmentary sectional view of the boom retraction mechanism and the boom attachment assembly in its retracted or uppermost position.

Fig. 3 is a fragmentary sectional view of the boom retraction mechanism in its extended position with the boom attachment assembly in trail position.

Fig. 6 is a view partly in section and partly in elevation showing the forward end of the boom with the button end thereon adapted for engagement by the shackle jaws.

Fig. 7 is a longitudinal sectional view of a forward portion of the boom showing the latching and release mechanism for the pickup hook.

Fig. 8 is a longitudinal sectional view of the rearward portion of the boom showing the hook and manner of supporting the same against rotation under an applied load and the manner of releasing it to drop the tow line.

Fig. 9 is an end elevational view of the boom taken from the hook end.

Fig. 10 is a transverse sectional view of the boom taken in the plane of line 10—10 in Fig. 8, and showing the manner of supporting the pivotally mounted hook against rotation thereby permitting pickup and towing of an object.

Fig. 11 is a horizontal longitudinal sectional view taken in the plane of line 11—11 in Fig. 10.

Fig. 13 is a sectional view of the boom showing the boom vane in elevation.

Figures 1, 12:
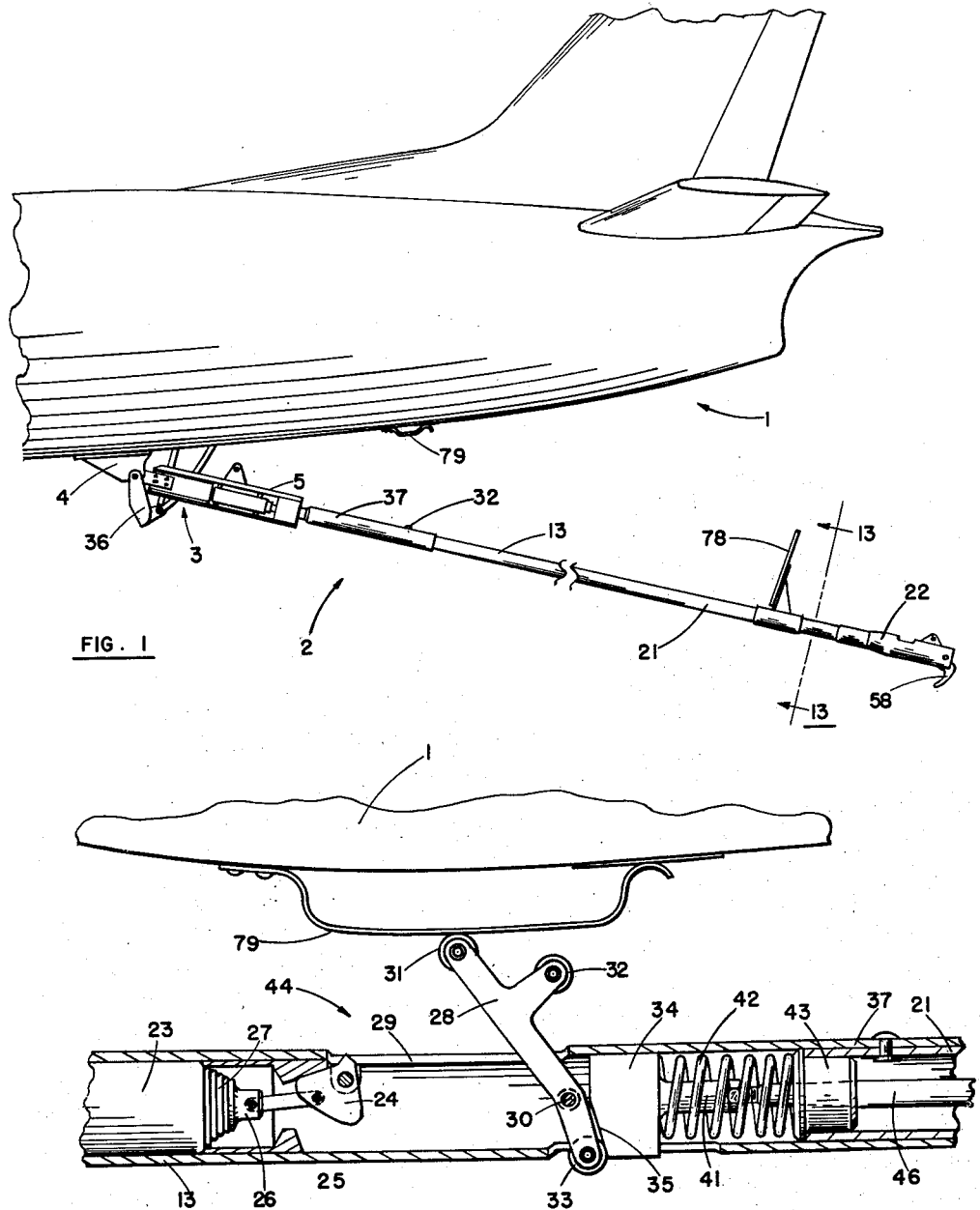
Fig. 1 is an elevational view of the aft portion of an aircraft incorporating the pickup and towing mechanism of this invention and having the boom in a freely trailing position.
Fig. 12 is a fragmentary longitudinal sectional view of the boom and fuselage showing the manner in which the hook holding mechanism is repositioned in flight after release of a tow line.
Figure 4:
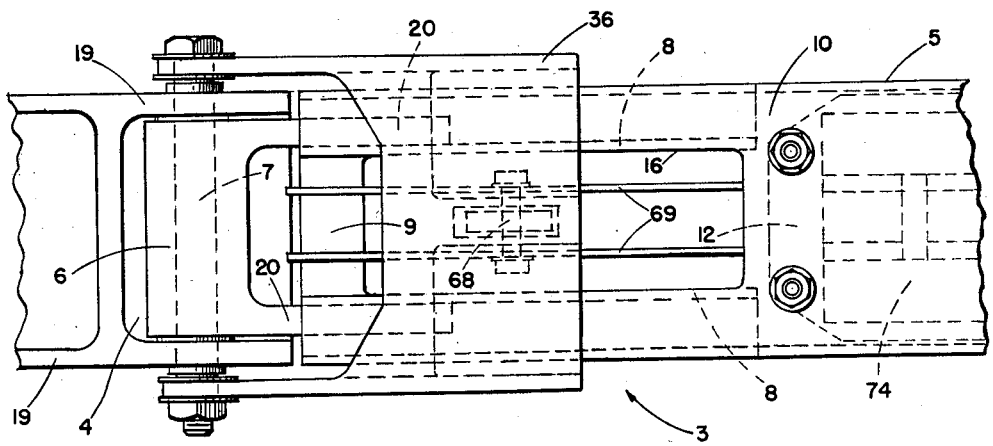
Fig. 4 is a bottom plan view of the boom attachment assembly.
Figure 5:
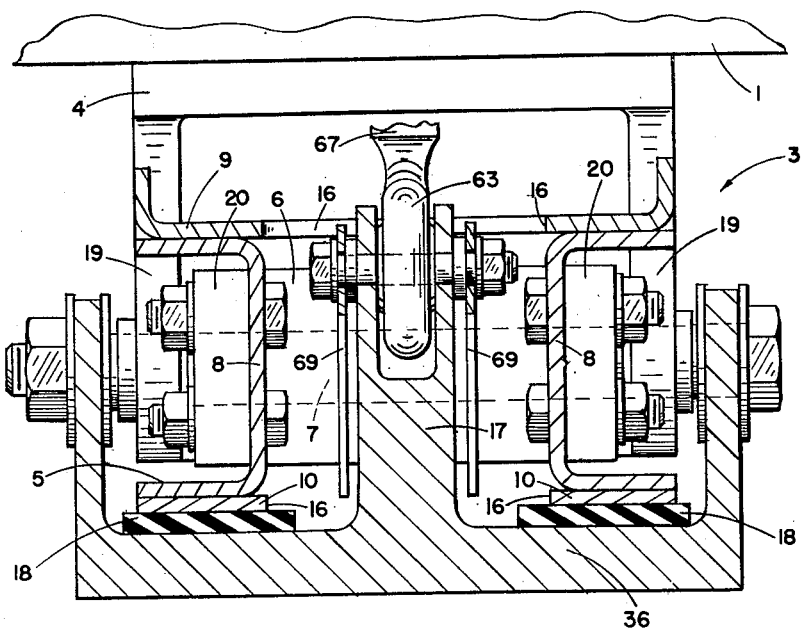
Fig. 5 is a transverse sectional view taken in the plane of line 5—5 in Fig. 2 and showing the cradle retraction fitting and the boom attachment assembly supported by the retractable cradle.

Referring specifically to the drawings wherein like reference characters have been used throughout the several views to designate like parts and referring at first to Fig. 1, reference numeral 1 generally designates an aircraft fitted with the pickup and tow boom assembly 2 of this invention.

In general, assembly 2 comprises a boom attachment assembly 3 and a tubular boom 13 releasably attached thereto. Attachment assembly 3 includes a support member 4 adapted for attachment to the body of the aircraft by bolting, riveting or other suitable means and a boom engaging member 5 pivotally attached thereto. Member 4 comprises a ribbed section having oppositely disposed side flanges 19 with aligned bore holes therein providing journals for a bushed pivot pin 7. A U-shaped member 6 is pivotally mounted between flanges 19 on pin 7 with the parallel arms 20 extending radially outwardly from the pin for connection to boom engaging member 5.

Boom engaging member 5 provides a means for releasably securing the tow boom 13 while allowing rotational movement of the boom in a longitudinal plane. Pivoted member 5 is a built-up assembly comprising essentially a top cover plate 9 and a bottom cover plate 10, both plates being shallow channel sections, bolted to side channel portions 8 at the pivoted end of the assembly and spaced apart and attached to a block 11 at the rear or boom attaching end of member 5. Plates 9 and 10 have slots 16 formed therein for passage of members of the retraction mechanism to be described below. The arms 20 of the pivotally mounted U-shaped member 6 are rigidly attached to the side channels 8 to form a built-up assembly for reception of the forward end of boom 13.

Block 11 is centrally bored to allow passage of the forward end of boom 13 for engagement with the jaws of a quick release shackle 12 mounted within member 5. Shackle 12 allows the boom to be released and jettisoned in the event it cannot be raised or a towline cannot be released to drop the target through malfunctioning of equipment. Shackle 12 will not be described in detail since it is a conventional electrically operated shackle of the type commonly used in the aircraft industry for fuel tank and bomb release shackles. In general it comprises a pair of pivotally mounted jaws 76 which are actuable by a rotary-type electrical solenoid operating through a toggle linkage to open and release the boom 13 which is normally gripped at end 14 by the shackle jaws.

Pivoted member 5 is freely movable about pin 7 in a plane normal thereto. To limit movement of the boom as well as to raise the boom to its retracted or uppermost position close beneath the body of the aircraft a boom retraction cradle 36 is pivotally mounted on the outer ends of pin 7. Cradle 36 has a central bifurcated bracket 17 projecting upwardly therefrom with a pivot pin 68 journaled in the bifurcation elements. Pivotally attached to pin 68 is the bearing rod end 63 of a piston rod 67 which forms part of a hydraulic actuator 66 pivotally supported at its upper end within the aircraft structure. Hydraulic pressure for the actuating cylinder is obtained by a connection to one of the existing hydraulic systems of the aircraft, such as the speed brake system, by means of conduits such as 64. Pads 18 of rubber or other suitable shock absorbent material are attached to the upper portion of cradle 36 to provide a cushioning effect when contacted by boom engaging member 5.

Locking of the boom in its upper position is accomplished by the latching mechanism 65. This mechanism comprises a pivotally mounted over-center type of catch or latch 70 for hooking engagement with a pin 75 supported by a bracket 74 attached to top cover plate 9. When rotated to its furthermost clockwise over-center position latch 70 securely locks member 5 and the attached boom in its upper position. Spring assembly 72 biases latch 70 towards its locking position. To unlock the latch 70 a pair of links 69 are pivotally attached to one edge of the latch 70. These links extend downwardly with the slotted lower end 73 of each link being slidably positioned on an outer end of pin 68, although it may be found desirable for clearance purposes, in some installations, to pivotally mount the links 69 on pin 68 and have the slotted portion 73 at the upper end of each link. Links 69 and the slot 73 therein are dimensioned to allow the hydraulic actuator 66 to draw the link 69 downwardly thereby rotating latch 70 in a counterclockwise direction and releasing the boom supporting pin 75 so that the boom may assume a free trail position dependent only upon the aerodynamic forces acting thereon. Slot 73 allows pivoted member 5 to be retracted by the hydraulic actuator 66 without turning the latch 70 into a locking position. Instead, as member 5 is drawn upwardly by the cradle 36 upon retraction of piston rod 67, pin 75 contacts cam portion 77 of latch 70 and causes the latch to rotate clockwise into its locking position as shown in Fig. 2. Instead of using the long curved one-piece link shown in Figs. 2 and 3 the links 69 may also optionally be made in the form of conventional two-piece telescoping type links. Piston rod 67, links 69 and brackets 74 all have access to the aircraft interior through a narrow slot 80 formed in the under-surface of the aircraft.

Boom 13 is formed of rigidly joined tubular sections of different diameters. As best shown in Fig. 1, the intermediate portion 21 of the boom has the least diameter and comprises the major longitudinal portion of the boom. Forward portion 37 of the boom contains the tow hook operating mechanism 44. This mechanism comprises an electrically actuated solenoid 23 having a compression spring 27 biasing axial stem 26 which is connected by means of link 25 to one edge of a pivotally mounted cam 24. In the unenergized position of the solenoid, spring 27 biases stem 26, link 25 and cam 24 to a rearward position. In this position latch cam 24 contacts a roller cam follower 31 mounted on one arm of a multiple-armed lever 28 and prevents clockwise rotational movement of the lever which is pivotally mounted on pin 30. Another roller cam follower 33 on an opposed arm of the lever contacts a sloping cam surface 35 of a member 34 which is biased toward the cam follower 33 by compression spring 42 abutting an apertured plug 43 in the end of tube 21. Spring 42 thereby exerts a downward force on roller 33 due to the sloping cam surface 35. This force tends to cause lever 28 to rotate clockwise, upon release of latching cam 24, in a manner to raise followers 31 and 32 out of the boom interior through slot 29 while the lever arm supporting roller 33 is depressed through slot 40. Such rotational movement of the lever positions it as shown in Fig. 12 and allows cam member 34 to move toward the left or forward end of the boom. Threadedly attached to an axial spindle 41 which is integral with member 34 is a hollow extension rod or tube 46. Tube 46 constitutes a push-pull rod extending through tube 21 to the rear of the boom 13 and transmits the locking and releasing motions of the hook operating mechanism 44 to the hook 58 which is pivotally mounted on a pin 61 and bushing 62 at the rear end of the enlarged aft boom portion 22 with the hook 58 projecting through a slot 57 in the boom.

The rearward end of rod 46 pivotally connects through a turnbuckle 47 and a rod end 49 to links 50. Links 50, in turn, are attached to a pivot pin 52 journaled in the lower end of the leg portions of a bifurcated suspension link 53 which is pivotally suspended from a pin 54 journaled in supports 55 attached to tube 22. A bushing or roller 56 is rotatably mounted on pin 52 between the leg portions of bifurcated suspension link 53. When the hook operating mechanism is in a locked position extension rod 46 and links 50 and 53 associated therewith, are in their most rearward position. In this position pickup and towing of a target may be accomplished since the extension arm 59 of the bell-crank type hook 58 is supported on roller 56 and the hook thereby prevented from rotating under the force of an applied load.

Upon actuation of solenoid 23 and release of operating mechanism 44, with consequent forward movement of the extension rod 46, supporting links 50 and 53 are drawn forwardly to release hook arm 59. The hook will then rotate in a counter-clockwise direction under the action of any attached load that is sufficient to overcome the force of spring 60 thereby allowing the towline to disengage from the hook. Upon release of the load the hook will be returned in a clockwise direction to its original position under the action of coil torsion springs 60 secured on bushing 62. The hook operating mechanism may then be recocked in flight in a manner to be described below to permit subsequent pickup and towing operations.

Vane 78 is attached to the boom for stabilizing it in an unrestrained, freely trailing, angular position dependent on the aerodynamic forces acting thereon. These forces are a function of the speed of the aircraft. At the forward end of the boom a solid rod end 38 extends integrally from tube 37 and has a mushroom or button head 14 at the end thereof for gripping engagement with the jaws of the shackle 12. A pin 15 is secured transversely in rod 38 to extend radially therethrough at an intermediate point and keys into slots 39 in the top and bottom cover plates 9 and 10. This pin and slot arrangement provides proper positioning of the boom relative to attachment assembly 3 and prevents rotation of the boom without interfering with the free release of the boom from shackle 12.

When not in use, as during take-off and landing, the boom will normally be retracted to its uppermost position. When it is desired to commence towing operations, the hydraulic cylinder may be actuated to extend the piston rod 67 and rotate cradle 36 about pivot pin 7 until it extends substantially normal to the lower surface of the aircraft. As piston rod 67 is partially extended pin 68 is brought to bear against the outer closed end of slot 73 in link 69. Further extension of the piston rod draws the links downwardly and rotates latch 70 counter-clockwise to an unlocked position. Upon release of catch-pin 75 from latch 70 boom engaging member 5 and attached boom 13 are then free to assume a trail position. Due to the presence of vane 78 the boom will assume an angular trail position, with respect to the lower surface of the aircraft, that is less than that of the fully extended cradle at normal air speeds. That is, the boom engaging member 5 will not rest against cradle 36 when the cradle is fully extended.

Pickup and towing of a target device may thus be accomplished with the boom in a freely movable position. After release of the target device the hook and its associated latching mechanism 44 may be recocked or repositioned in flight to enable a second pickup and tow to be made. Recocking is accomplished by retracting the extended piston rod 67 and the attached cradle 36. Cradle 36 contacts member 5 in its upward arc and draws it and attached boom 13 upwardly to its retracted position. As the boom is drawn upwardly rollers 31 and 32 of lever 28 successively contact a leaf spring bumper 79 and, upon continued upward movement of the boom, lever 28 is forced downwardly into its normal position within the boom thereby forcing member 34 rearwardly against compression spring 42 and moving rod 46 and attached links 50 and 53 rearwardly into a hook supporting position. As lever 28 is repositioned within the boom interior roller follower 31 forces latch cam 24 forwardly to allow follower 31 to pass and then the cam is forced rearwardly by spring 27 to secure lever 28 in a position whereby it locks the linkage preventing rotation of hook 58 under the applied load of a towline.

Vane 78 is of such dimensions that even at the relatively low speeds required for landing the aerodynamic forces exerted thereon will cause the boom to assume a relatively flat trail position, without any load, and that will not interfere with the ability of the aircraft to land. Thus, should the retraction mechanism fail, the aircraft could still be landed with the boom in a trail position. As an additional safety feature the electrically operated boom release shackle 12 may be actuated to open the shackle jaws and disengage button head 14. The drag force acting on the boom and attached vane can then pull the boom from the boom engaging member 5. Electrical cable 81 connects the tow hook operating solenoid 23 to a suitable electrical energy source and includes a pull-away fitting not shown.

It will be evident that this invention is not limited to the picking up and towing of aerial targets only, but that it can also be used for any purpose requiring a fly-by pickup and tow such as for the transportation of supplies and the like.

While a particular embodiment of this invention has been illustrated and described herein, it will be apparent that various changes and modifications may be made in the construction and the arrangement of the various parts without departing from the spirit and scope of this invention in its broader aspects or as defined in the following claims.

We claim:
1. A device for air-to-ground pickup and towing of a towline and attached load by an aircraft while in flight comprising a boom pivotally attached to the lower portion of the aircraft; means for alternately extending said boom to a trailing position beneath the aircraft and retracting said boom to a raised position in juxtaposition to the lower portion of the aircraft and substantially parallel thereto; means on said boom for releasably holding a towline; means for releasing the towline during flight whereby the attached load may be dropped; and means on said boom operable by contact with the lower portion of the aircraft upon retraction of said boom to a raised position for recocking said towline holding means during fluight after release of a first towline and attched load, whereby successive towlines and attached loads may be sequentially picked up and dropped by the aircraft during flight.

2. An aerial tow target boom for attachment to an aircraft comprising a boom having its forward end pivotally attached to an aircraft for trailing therebelow; means for raising said boom; means at the aft end of the boom for releasably holding an aerial target towline; means for releasing the towline holding means during flight whereby the target may be dropped; and means for recocking the towline holding means after release of the towline by raising said boom to its uppermost position whereby another tow target pickup may be effected, said recocking means including a cam actuated means operable upon contact with fixed structure of the aircraft when the boom is in its uppermost raised position.

3. An aerial tow target boom for attachment to an aircraft comprising a boom pivotally attached to the aircraft for arcuate longitudinal swinging movement; a mechanism for releasably locking said boom in an up-position at the top of said arc; means for retracting said boom to its uppermost position and for releasing said boom locking mechanism and lowering the boom to its lowermost arcuate position whereby it may assume a trailing angular position below the aircraft during flight; a pivotally mounted hook at one end of said boom releasably positioned for supporting a towline and attached target device; a releasable hook latching means for holding the hook in a target towline engaging position; means for releasing said hook latching means; and means on said boom for contacting the aircraft when the boom is retracted to its uppermost position and for repositioning the hook in said hook latching means during flight after release of a towline whereby another towline and attached aerial target may be picked up from the ground by the aircraft while in flight.

4. In combination with an aircraft, a device for picking up a towline and attached burden in flight comprising a hollow boom pivotally attached to the aircraft, said boom being rotatable in a longitudinal plane; a hook pivotally mounted at the rearward end of said boom and projecting therefrom; a cam-locked hook-positioning means within said hollow boom; electrical means within said boom for moving said cam-lock to release said hook positioning means whereby the hook may pivot to allow the towline and attached burden to be dropped; means for extending and retracting said boom from and to its uppermost position beneath the aircraft; and means actuated by retraction of the boom to bias the hook positioning means to secure the hook in a pickup and towing attitude whereby another towline may be hooked while the aircraft is airborne and an attached burden towed off the ground.

5. The combination set forth in claim 4 including a spring biased latching means for locking said boom in its retracted uppermost position beneath the aircraft, said boom latching means being released upon downward movement of the boom extending and retracting means.

6. The combination set forth in claim 5 including a vane attached to said boom for assisting in stabilizing the boom in its freely movable trailing attitude.

References Cited in the file of this patent
UNITED STATES PATENTS

| 2,276,312 | Jurschick | Mar. 17, 1942 |
| 2,419,455 | Lee | Apr. 22, 1947 |
| 2,433,136 | Mancini | Dec. 23, 1947 |
| 2,486,397 | Feilbach | Nov. 1, 1949 |
| 2,696,957 | Brown | Dec. 14, 1954 |

FOREIGN PATENTS

| 792,022 | France | Oct. 14, 1935 |

OTHER REFERENCES
"Aviation Week," Oct. 31, 1949.